United States Patent
Takita et al.

Patent Number: 5,350,804
Date of Patent: Sep. 27, 1994

[54] RUBBER COMPOSITION CONTAINING RECLAIMED SILICONE RUBBER

[75] Inventors: Ken-ichi Takita; Masaharu Takahashi, both of Gunma, Japan

[73] Assignee: Shin-Etsu Chemical Co., Ltd., Tokyo, Japan

[21] Appl. No.: 99,498

[22] Filed: Jul. 30, 1993

[30] Foreign Application Priority Data

Jul. 31, 1992 [JP] Japan ............................... 4-224954

[51] Int. Cl.$^5$ .............................................. C08L 83/00
[52] U.S. Cl. .................................... 525/104; 525/105
[58] Field of Search ............................. 525/104, 105

[56] References Cited

U.S. PATENT DOCUMENTS

| | | | |
|---|---|---|---|
| 4,942,202 | 7/1990 | Zama et al. | 525/104 |
| 4,985,483 | 1/1991 | Saito et al. | 525/104 |

*Primary Examiner*—Melvyn I. Marquis

[57] ABSTRACT

A novel method is proposed for the effective utilization of scraps of cured silicone rubbers, of which no method of disposal is known heretofore other than discarding as a waste material. Namely, scraps of cured silicone rubbers can be compounded in a considerably large amount with a vulcanizable composition based on an organic rubbery elastomer such as fluorocarbon rubbers, e.g., binary copolymers of hexafluoropropylene and vinylidene fluoride, and dispersed therein in such fineness that particles of the cured silicone rubber can no longer be recognized by the naked eyes only when the organic rubbery elastomer composition has a specific Mooney viscosity ($ML_{1+4}$ 100° C.) of at least 70 to give a uniform curable rubber composition capable of being cured into vulcanized rubber articles having various properties as good as or comparable with those of the vulcanized rubber articles from the same organic rubbery elastomer without admixture of cured silicone rubber scraps.

8 Claims, No Drawings

RUBBER COMPOSITION CONTAINING RECLAIMED SILICONE RUBBER

BACKGROUND OF THE INVENTION

The present invention relates to a rubber composition or, more particularly, to a rubber composition which is a composite consisting of a matrix phase of an unvulcanized rubbery elastomer such as fluorocarbon rubbers, EPDM rubbers and the like and a finely dispersed phase therein which is a cured silicone rubber comminuted so finely that particles of the silicone rubber are no longer visible. The rubber composition of the invention is capable of giving vulcanized rubber articles having excellent rubbery properties despite the outstanding inexpensiveness since scraps of cured silicone rubbers occurring in the molding and curing process of silicone rubber articles or reclaimed as a waste of silicone rubber articles after use can be used to provide the dispersed phase in the matrix of the unvulcanized rubbery matrix.

It is usual that scraps of vulcanized rubbers occurring in the molding and vulcanizing process as burrs or unacceptable products or obtained as a waste material after prolonged use of vulcanized rubber articles are not always discarded as such but are recycled and re-used as a reclaimed rubber after refining by washing, pulverization, desulfurization and the like into a rubber powder having a particle size of 30 to 80 mesh, which can be compounded in a considerably large amount with an unvulcanized rubber stock under a shearing force to be dispersed in the matrix of the unvulcanized rubber to such an extent that the particles of the reclaimed rubber are no longer visible to the naked eyes. Such a composite rubber stock containing a powder of the reclaimed rubber can be again molded and vulcanized into vulcanized rubber articles having rubbery properties comparable to those prepared from a fresh rubber alone so that economical advantages are obtained owing to the inexpensiveness of the reclaimed rubber as compared with a fresh rubber.

As to silicone rubbers as a class of synthetic rubbers, the production and consumption of silicone rubber articles are rapidly growing more and more in a variety of application fields by virtue of the excellent properties thereof as compared with other organic synthetic rubbers such as heat and cold resistance, weatherability, electric insulation, etc., such that the amount of scraps of cured silicone rubbers, occurring as burrs and unacceptable products in the molding process of silicone rubber articles is also rapidly increasing and as a waste of used-up silicone rubber articles. Nevertheless, no efficient way has yet been established for recycling and re-using scraps of cured silicone rubber articles. Scraps of cured silicone rubber articles can of course be converted into a fine powder in a way similar to that for organic rubbers mentioned above but, when such a powder of reclaimed silicone rubber scraps is blended with a fresh uncured silicone rubber and the composite silicone rubber stock is molded and cured into cured silicone rubber articles, the reclaimed silicone rubber can never be fully comminuted to such a fineness that the particles thereof are no longer visible to the naked eyes. Instead the particles remain as a heterogeneous phase in the matrix of the fresh silicone rubber and eventually the particles of the reclaimed silicone rubber fall out of the cured silicone rubber body. Accordingly, the result is that such a cured silicone rubber article prepared by blending a powder of reclaimed silicone rubber scraps is very inferior in mechanical strengths as well as in the permanent compression set and heat resistance. Thus, no practically applicable way is known for the efficient utilization of scraps of cured silicone rubbers so that the only way to dispose scraps of cured silicone rubbers is just to discard them as a waste material of nuisance. Therefore, it is eagerly desired to develop an efficient way to effectively utilize such cured silicone rubber scraps.

SUMMARY OF THE INVENTION

The present invention accordingly has a primary object to efficiently utilize scraps of cured silicone rubbers so as to reduce the problems accompanying disposal of such scraps. The object can be achieved by preparing a curable rubber composition which comprises an organic rubbery elastomer-based composition having a Mooney viscosity ($ML_{1+4}$ 100° C.) of at least 70 and a cured silicone rubber finely divided and dispersed in the matrix of the organic rubbery elastomer in an amount in the range from 0.1 to 50 parts by weight per 100 parts by weight of the organic rubbery elastomer-based composition.

A cured silicone rubber can be finely dispersed by milling under a shearing force in the matrix of an organic rubbery elastomer only when the organic rubbery elastomer-based composition has a Mooney viscosity ($ML_{1+4}$ 100° C.) of at least 70. This provides a composite rubber composition capable of giving a cured rubber article having rubbery properties as good as or comparable with those of the cured rubber article prepared from the same organic rubbery elastomer without admixture of the cured silicone rubber scraps despite the high loading amount of the cured silicone rubber scraps. This unexpected effect is very remarkable when the organic rubbery elastomer is a fluorocarbon rubber such as a binary copolymer of hexafluoropropylene and vinylidene fluoride, a ternary copolymer of hexafluoropropylene, vinylidene fluoride and tetrafluoroethylene or an EPDM rubber.

DETAILED DESCRIPTION OF THE PREFERRED EMBODIMENTS

As is described above, the primary object of the present invention is to provide a means for the effective utilization of scraps of cured silicone rubbers, where discarding as a waste was the only way heretofore to dispose the same. This object can be achieved by compounding scraps of cured silicone rubbers with an organic rubbery elastomer having a specified value of the Mooney viscosity under a shearing force. The cured silicone rubber can be finely comminuted and dispersed in the matrix of the organic rubbery elastomer in such a fineness that the particles of the cured silicone rubber can no longer be recognized by the naked eyes. Thus, there is provided a seemingly homogeneous rubber composition capable of giving a cured or vulcanized rubber article exhibiting mechanical strengths, permanent compression set and heat resistance which are not significantly decreased compared with a rubber article prepared from the same organic rubbery elastomer not compounded with scraps of cured silicone rubbers.

Although it is a well established technology to prepare a rubber blend of an organic rubbery elastomer such as natural rubber, SBR, fluorocarbon rubbers, EPDM rubbers and the like with a silicone elastomer, the silicone elastomer used in the prior art as a constituent of such a rubber blend is limited to uncured silicone elastomers because no uniform dispersion of the silicone elastomer in the matrix of the organic rubbery elastomer can be obtained when the silicone elastomer is in a cured state. It was a quite unexpected discovery accordingly that a cured silicone rubber could be very finely and uniformly dispersed in the matrix of an organic rubbery elastomer only when the organic rubbery elastomer-based composition has a specific value of the Mooney viscosity ($ML_{1+4}$ 100° C.) which should be at least 70 or, preferably, at least 100.

The Mooney viscosity value of the organic rubbery elastomer referred to above is obtained by the measurement of a composition of the organic rubbery elastomer already compounded with various additives including reinforcing fillers and other ingredients excepting the cured silicone rubber. Accordingly, it is not always necessary that the organic rubbery elastomer per se has such a high Mooney viscosity. An organic rubbery elastomer having a low Mooney viscosity can be used because a rubber composition based thereon may have the required high Mooney viscosity when the organic rubbery elastomer is compounded with a relatively large amount of a reinforcing filler and the like.

Although the type of the organic rubbery elastomer is not particularly limitative, it is preferable that the organic rubbery elastomer is selected from those which can be improved in one or more properties or can be imparted with a new advantageous property by compounding with an uncured silicone elastomer. Needless to say, any organic rubbery elastomers of which no improvement in the properties can be expected by blending with a silicone rubber can be used in the present invention, if desired. Examples of preferable organic rubbery elastomers include fluorocarbon rubbers, EPDM rubbers, acrylic rubbers and the like.

When a fluorocarbon rubber is used as the organic rubbery elastomer in the present invention, the resultant composite rubber composition can be improved with respect to the low-temperature characteristics, since one of the major defects in most fluorocarbon rubbers is their poor low-temperature characteristics. In this regard, examples of fluorocarbon rubbers suitable for use in the inventive rubber composition include binary copolymers of hexafluoropropylene and vinylidene fluoride and ternary copolymers of hexafluoropropylene, vinylidene fluoride and tetrafluoroethylene since these fluorocarbon rubbers are particularly poor in the low-temperature characteristics and the effect of improvement to be obtained by compounding with a cured silicone rubber is highly remarkable.

The cured silicone rubber to be compounded with an organic rubbery elastomer according to the present invention is not particularly limitative in respect of the type of the curing reaction, which may include peroxide curing, addition reaction curing and condensation reaction curing provided that the principal ingredient thereof is an organopolysiloxane. It is optional that the organopolysiloxane as the principal ingredient of the silicone rubber is compounded with a minor amount of an organic rubbery elastomer and various kinds of additives including finely divided silica fillers conventionally used for the reinforcement of silicone rubbers and other modifier agents used to improve the properties of the silicone rubber each in a limited amount.

The organopolysiloxane mentioned above has a chemical composition represented by the average unit formula $R_aSiO_{(4-a)/2}$, in which R is an unsubstituted or substituted monovalent hydrocarbon group exemplified by alkyl groups such as methyl, ethyl, propyl and butyl groups, alkenyl groups such as vinyl, allyl and butenyl groups and aryl groups such as phenyl and tolyl groups as well as those substituted groups obtained by replacing a part or all of the hydrogen atoms in the above named hydrocarbon groups with halogen atoms, cyano groups and the like such as chloromethyl, chloropropyl, 3,3,3-trifluoropropyl and 2-cyano ethyl groups and the subscript a is a positive number in the range from 1.95 to 2.05. It is optional that a part of the groups denoted by R are hydrogen atoms, hydroxy groups, alkoxy groups, e.g., methoxy and ethoxy groups, acyloxy groups, e.g., acetoxy group, and the like which may serve to provide the crosslinking sites to the organopolysiloxane molecules.

The process by which the silicone rubber is cured is not limitative and any scraps of cured silicone rubbers can be used in the present invention regardless of the process of curing including extrusion molding, injection molding, compression molding and the like to give a shaped body followed by curing. It is more or less unavoidable in these molding and curing processes that a considerable amount of burrs and unacceptable cured silicone rubber articles are produced for which no means of disposal other than to discard them as a waste material was previously known, since they have no reclaimability as such. Moreover, the amount of worn-out silicone rubber articles is rapidly increasing year by year and they also must be discarded heretofore as a waste material. These scraps of cured silicone rubbers can be efficiently utilized according to the present invention.

As is mentioned before, the blending work of the organic rubbery elastomer and scraps of cured silicone rubbers is performed under a shearing force as high as possible. Suitable blending machines include two-roller mills, pressurizable kneaders, Banbury mixers and the like. When scraps of cured silicone rubbers are blended in these blending machines with an organic rubbery elastomer-based composition having a specified Mooney viscosity under a shearing force, the silicone rubber scraps are readily comminuted and dispersed in the matrix of the organic rubbery elastomer in such a fineness that the particulate form of the cured silicone rubber can no longer be recognized at least by the naked eyes.

Since the primary object of the present invention is to provide a means for the effective utilization of scraps of cured silicone rubbers, the amount of the scraps of cured silicone rubbers is desirably as large as possible although the properties of the cured rubber articles prepared from the composite rubber composition would be greatly decreased when the amount of the cured silicone rubber scraps blended with the organic rubbery elastomer is too large. In this regard, the amount of the cured silicone rubber scraps should not exceed 50 parts by weight or, preferably, 30 parts by weight per 100 parts by weight of the organic rubbery elastomer. As to the lower limit in the amount of the cured silicone rubber, the amount is at least 0.1 part by weight or, preferably, at least 2 parts by weight per 100 parts by weight of the organic rubbery elastomer. This is especially the ease when certain improvements are desired in the properties of the cured rubber articles as in the case of fluorocarbon rubbers which can be improved in the low-temperature characteristics and EPDM rubbers which can be improved in the heat resistance by blending with a cured silicone rubber.

The composite rubber composition according to the present invention can be shaped and vulcanized by a known rubber vulcanization method such as compression molding, extrusion molding, calendering, transfer molding, injection molding and the like into any desired forms such as pipes, sheets, rods and the like as well as various irregular forms followed by curing or vulcanization in a conventional manner. The thus obtained rubber articles have various properties almost equivalent to those of the rubber articles prepared from a blend of the same organic rubbery elastomer with uncured silicone rubber and an improvement can even be expected in some properties such as low-temperature characteristics, in particular, when the organic rubbery elastomer is a fluorocarbon rubber.

Since the properties of the vulcanized rubber articles obtained from the composition according to the present invention depend to some extent on the chemical composition of the cured silicone rubber scraps blended with the organic rubbery elastomer, it is desirable from the standpoint of quality control that the lots of scraps of cured silicone rubbers are adjusted to be uniform as far as possible in respect of the kinds of the organic groups bonded to the silicon atoms, content of the organopolysiloxane constituents in the cured rubber and other chemical constituents.

EXAMPLES

In the following, the present invention is illustrated in more detail by way of examples and comparative examples, in which the term of "parts" always refers to "parts by weight" and the values of viscosity are all those obtained by the measurement at 25° C.

In the following, two cured silicone rubbers, referred to as cured silicone rubbers A and B, are prepared to simulate cured silicone rubber scraps.

Cured silicone rubber A

A silicone rubber composition was prepared by uniformly compounding 100 parts of a diorganopolysiloxane having a viscosity of 10,000,000 centistokes consisting of 99.875% by moles of the dimethyl siloxane units of the unit formula $(CH_3)_2SiO$ and 0.125% by moles of the methyl vinyl siloxane units of the unit formula $(CH_2=CH)(CH_3)SiO$ with a dimethyl vinyl silyl group at each molecular chain end with 40 parts of a fumed silica filler (Aerosil 200, a product by Nippon Aerosil Co.) and 4 parts of diphenyl silane diol as a dispersion aid to give a base compound which was subjected to a heat treatment at 150° C. for 4 hours and then mastication and plasticization on a two-roller mill. The thus obtained base compound was admixed with 0.4% by weight of 2,5-bis(tert-butylperoxy)-2,5-dimethyl hexane as a curing agent by kneading on a two-roller mill to give a curable silicone rubber composition which was cured by compression molding at 165° C. for 10 minutes into a cured silicone rubber sheet having a thickness of 2 mm followed by post-curing at 200° C. for 4 hours. This cured silicone rubber sheet was cut into 2 cm by 2 cm wide square pieces as a simulation of scraps of cured silicone rubbers.

Cured silicone rubber B

The formulation of a base compound of silicone rubber was the same as in the preparation of the cured silicone rubber A described above excepting replacement of the diorganopolysiloxane with the same amount of another diorganopolysiloxane having a viscosity of 10,000,000 centistokes consisting of 99.85% by moles of the methyl 3,3,3-trifluoropropyl siloxane units of the unit formula $(CF_3CH_2CH_2)(CH_3)SiO$ and 0.15% by moles of the methyl vinyl siloxane units with a hydrogen atom directly bonded to the silicon atom at each molecular chain end. This base compound was admixed with 0.6% by weight of the same curing agent as in the cured silicone rubber A and cured into a cured silicone rubber sheet under the same conditions as in the preparation of the cured silicone rubber A followed by cutting into 2 cm by 2 cm square pieces of the cured silicone rubber sheet.

EXAMPLE 1

An EPDM rubber composition having a Mooney viscosity ($ML_{1+4}$ 100° C.) of 79 was prepared by uniformly compounding, on a two-roller mill, 100 parts of an EPDM rubber having a Mooney viscosity ($ML_{1+4}$ 100° C.) of 35 and an iodine value of 14, of which the content of the propylene moiety was 22% by weight (Esprene 514, a product by Mitsui Petrochemical Co.) with 60 parts of a precipitated silica filler having a specific surface area of 190 $m^2/g$ (Nipsil VN3 LP, a product by Nippon Silica Co.) and 15 parts of a process oil (Sunpar 2280, a product by Nippon Sun Petroleum Co.). This EPDM rubber composition and 10% by weight of the cured silicone rubber A were milled together on a two-roller mill with the result that the cured silicone rubber was finely comminuted to such a fineness that the particulate form of the cured silicone rubber could no longer be recognized by the naked eyes.

COMPARATIVE EXAMPLE 1

The base compound prepared in the course of the preparation of the cured silicone rubber B, which had a Mooney viscosity ($ML_{1+4}$ 100° C.) of 40, was blended and milled with 10% by weight of the cured silicone rubber A on a two-roller mill to find that the cured silicone rubber could hardly be comminuted and remained in a clearly recognizable particulate form in the matrix.

Comparative Example 2

An EPDM rubber composition having a Mooney viscosity ($ML_{1+4}$ 100° C.) of 50 was prepared in the same manner as in Example 1 excepting a decrease of the amounts of the precipitated silica filler and the process oil to 20 parts and 5 parts, respectively. This EPDM rubber composition was blended and milled together with 10% by weight of the cured silicone rubber A on a two-roller mill to find that the cured silicone rubber could hardly be comminuted and remained in a clearly recognizable particulate form in the matrix.

EXAMPLES 2 AND 3 AND COMPARATIVE EXAMPLES 3 TO 5

In each of Examples 2 and 3, a fluorocarbon rubber composition was prepared by uniformly blending 80 parts of a fluorocarbon rubber, which was a binary copolymer of hexafluoropropylene and vinylidene fluoride and contained 66% by weight of fluorine, having a Mooney viscosity ($ML_{1+4}$ 100° C.) of 75 (FC-2260, a product by Sumitomo 3M Co.) with 25 parts or 20 parts, respectively, of a fumed silica filler (Aerosil 300, a product by Nippon Aerosil Co.), 3 parts of calcium hydroxide as an acid acceptor, 1.3 parts of 2,5-bis(tert-butylperoxy)-2,5-dimethyl hexane as a vulcanizing agent, 1.1 parts of triallyl isocyanurate as a vulcanization aid and 30 parts of the cured silicone rubber A or B, respectively. These fluorocarbon rubber compositions were examined for the state of dispersion of the cured silicone rubber and a particulate form of the cured silicone rubber could not be found by the naked eyes.

These rubber compositions were compression-molded into a sheet at 165° C. for 10 minutes followed by a post-curing treatment at 200° C. for 4 hours and the test sheets were subjected to measurements of the mechanical properties as well as to the immersion tests according to JIS K 6301 in a JIS Fuel C oil at 25° C. for 70 hours and in methyl alcohol at 25° C. for 70 hours and a low-temperature torsion test to give the results shown in Table 1 below.

In Comparative Examples 3 and 4, the formulations of the fluorocarbon rubber compositions were the same as in Examples 2 and 3, respectively, excepting replacement of the cured silicone rubber A or B with the same amount of the same silicone rubber composition before admixture of the curing agent. The formulation in Comparative Example 5 was the same as in Example 2 excepting omission of the cured silicone rubber A and an increase of the amount of the fluorocarbon rubber from 80 parts to 100 parts.

The test sheets prepared from these comparative rubber compositions were subjected to the same tests as in Examples 2 and 3 to give the results also shown in Table 1.

TABLE 1

|  | Example | | Comparative Example | | |
| --- | --- | --- | --- | --- | --- |
|  | 2 | 3 | 3 | 4 | 5 |
| Hardness, JIS | 88 | 92 | 89 | 92 | 89 |
| Ultimate elongation, % | 260 | 240 | 290 | 270 | 360 |
| Tensile strength, kgf/cm$^2$ | 140 | 200 | 151 | 182 | 260 |
| Tear strength, A, kgf/cm | 34 | 50 | 35 | 45 | 44 |
| Permanent compression set, %, after 22 hours at 180° C. | 26 | 38 | 26 | 31 | 44 |
| Immersion test in JIS Fuel C | | | | | |
| Increment, %, in volume | +40.2 | +11.8 | +39.5 | +11.5 | +3.6 |
| Increment, %, in weight | +18.3 | +5.4 | +18.6 | +5.5 | +1.6 |
| Immersion test in methyl alcohol | | | | | |
| Increment, %, in volume | +95.0 | +144 | +96.1 | +120 | +164 |
| Increment, %, in weight | +46.5 | +64.8 | +45.0 | +53.5 | +69.7 |
| Low-temperature torsion test, T-10, °C. | −30.5 | −22.1 | −30.8 | −21.7 | −20.2 |

What is claimed is:

1. A composite rubber composition which comprises:
   (a) 100 parts by weight of an organic rubbery elastomer composition having a Mooney viscosity ($ML_{1+4}$ 100° C.) of at least 70 forming the matrix phase of the composite rubber composition; and
   (b) from 0.1 to 50 parts by weight of a cured silicone rubber as a dispersed phase in the matrix phase.

2. The composite rubber composition as claimed in claim 1 in which the organic rubbery elastomer is a fluorocarbon rubber.

3. The composite rubber composition as claimed in claim 2 in which the fluorocarbon rubber is a binary copolymer of hexafluoropropylene and vinylidene fluoride or a ternary copolymer of hexafluoropropylene, vinylidene fluoride and tetrafluoroethylene.

4. The composite rubber composition as claimed in claim 1 in which the organic rubbery elastomer is an EPDM rubber.

5. The composite rubber composition of claim 1, wherein the organic rubbery elastomer composition, (a), has a Mooney viscosity ($ML_{1+4}$ 100° C.) of at least 100.

6. The composite rubber composition of claim 1, wherein the organic rubbery elastomer composition, (a), contains a reinforcing filler.

7. The composite rubber composition of claim 1, wherein the cured silicone rubber, (b), is obtained by curing of a composition containing an organopolysiloxane of the average unit formula $R_a SiO_{(4-a)/2}$ wherein R is a monovalent hydrocarbon group, optionally substituted with halogen atoms or cyano groups, or R is a hydrogen, hydroxy, alkoxy or acyloxy group and a is a number from 1.95 to 2.05.

8. The composite rubber composition of claim 1, wherein the cured silicone rubber, (b), is present in an amount of 2 to 30 parts by weight.

* * * * *